US009462542B2

United States Patent
Zhao et al.

(10) Patent No.: US 9,462,542 B2
(45) Date of Patent: Oct. 4, 2016

(54) METHOD AND BASE STATION FOR A CELL SELECTION (71) Applicant: Telefonaktiebolaget L M Ericsson (publ), Stockholm (SE)

(72) Inventors: Shuang Zhao, Beijing (CN); Yanchao Niu, Beijing (CN); Rui Zha, Beijing (CN); Min Wen, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 14/438,665

(22) PCT Filed: Nov. 7, 2012

(86) PCT No.: PCT/CN2012/084195
§ 371 (c)(1),
(2) Date: Apr. 27, 2015

(87) PCT Pub. No.: WO2014/071561
PCT Pub. Date: May 15, 2014

(65) Prior Publication Data
US 2015/0257092 A1 Sep. 10, 2015

(51) Int. Cl.
*H04W 48/20* (2009.01)
*H04W 36/24* (2009.01)
*H04W 48/08* (2009.01)
*H04W 48/16* (2009.01)
*H04W 36/30* (2009.01)
*H04W 88/08* (2009.01)

(52) U.S. Cl.
CPC ............ *H04W 48/20* (2013.01); *H04W 36/24* (2013.01); *H04W 48/08* (2013.01); *H04W 36/30* (2013.01); *H04W 48/16* (2013.01); *H04W 88/08* (2013.01)

(58) Field of Classification Search
CPC ... H04W 48/20; H04W 36/24; H04W 48/08; H04W 36/30; H04W 88/08; H04W 48/16
See application file for complete search history.

(56) References Cited

U.S. PATENT DOCUMENTS

| 2007/0254658 A1 | 11/2007 | Fabien et al. |
| 2009/0137251 A1 | 5/2009 | Ji et al. |
| 2012/0044922 A1* | 2/2012 | Ishii ........................ H04L 5/001 370/338 |

(Continued)

FOREIGN PATENT DOCUMENTS

GB 2482734 A 2/2012

OTHER PUBLICATIONS

PCT Notification of Transmittal of the International Search Report and the Written Opinion of the International Searching Authority, or the Declaration for International application No. PCT/CN2012/084195, Aug. 15, 2013.

(Continued)

*Primary Examiner* — Brandon Miller
(74) *Attorney, Agent, or Firm* — Baker Botts, LLP (57) ABSTRACT

A method and a base station for a cell selection are provided. The method comprises obtaining an uplink traffic status of a user equipment. The method also comprises determining, based upon the plink traffic status, a bias value for a measured quality indicator of a down link received signal with respect to the user equipment. In addition, the method comprises performing the cell selection based upon the bias value and the measured quality indicator. With the present invention, a proper cell could be selected and thus both peak DL and UL throughput can be improved in the heterogeneous network.

12 Claims, 4 Drawing Sheets

(56) References Cited

U.S. PATENT DOCUMENTS

2012/0108246 A1* 5/2012 Monogioudis ........ H04W 16/18
                                                    455/446
2012/0188884 A1   7/2012 Simonsson
2012/0218966 A1   8/2012 Yamazaki
2014/0120921 A1*  5/2014 Keskitalo et al. ............ 455/438

OTHER PUBLICATIONS

R4-120596—3GPP TR 36.826 V0.13.0; 3rd Generation Partnership Project; Technical Specification Group TSG RAN; Evolved Universal Terrestrial Radio Access (E-UTRA); Relay radio transmission and reception (Release 10), Feb. 2012.

R1-083813; 3GPP TSG-RAN WG1 #54bis; Prague, Czech Republic; Title: Range expansion for efficient support of hetergencous networks, Sep. 29-Oct. 3, 2008.

3GPP TS 36.321 V10.4.0; 3rd Generation Partnership Project; Technical Specification Group Radio Access Network; Evolved Universal Terrestrial Radio Access (E-UTRA); Medium Access Control (MAC) protocol specification (Release 10), Dec. 2011.

R1-094225-R1-094225; 3GPP TSG-RAN WG1 #58bis; Miyazaki, Japan; Title: DL Performance with Hotzone Cells, Oct. 12-16, 2009.

ETSI TS 136 331 V9.5.0; LTE; Evolved Universal Terrestrial Radio Access (E-UTRA); Radio Resource Control (RRC); Protocol specification (3GPP TS 36.331 version 9.5.0 Release 9), Jan. 2011.

Pantech, "Discussions on CRE bias", 3GPP TSG RAN2, R2-111293 Discussions on CRE Bias, 3rd Generation Partnership Project (3GPP), Taipei, Taiwan; Feb. 21, 2011; XP050493770; Meeting # 73, Feb. 15, 2011.

Written Opinion Communication of EESR regarding Appl. No. 12 888 015.0, May 5, 2016.

Supplementary European Search Report (EESR), Appl. No. EP 12 88 8015, May 2, 2016.

* cited by examiner

| Buffer Size #0 | Buffer Size #1 | | Oct 1 |
| Buffer Size #1 | Buffer Size #2 | | Oct 2 |
| Buffer Size #2 | Buffer Size #3 | | Oct 3 |

METHOD AND BASE STATION FOR A CELL SELECTION

PRIORITY

This nonprovisional application is a U.S. National Stage Filing under 35 U.S.C. §371 of International Patent Application Serial No. PCT/CN2012/084195 filed Nov. 7, 2012, and entitled "Method and Base Station For A Cell Selection."

BACKGROUND

1. Field

Certain exemplary embodiments of the present invention relate generally to wireless communications, and more particularly, to a method and a base station for a cell selection.

2. Description of the Related Art

Various abbreviations that appear in the specification and/or in the drawing figures are defined as below:
3GPP 3rd Generation Partnership Project
BS Base Station
BSR Buffer Status Report
DL Downlink
eNB evolved Node B
HetNet Heterogeneous Network
IE Information Element
LTE Long Term Evolution
MAC Media Access Control
RRC Radio Resource Control
RSRP Reference Signal Received Power
SNR Signal to Noise Ratio
UE User Equipment
UL Uplink A demand for higher data rates in wireless networks has been unrelenting and triggered the design and development of new data-minded cellular standards, such as a 3GPP LTE standard. Currently, such a rapidly increasing demand is fulfilled mainly by higher bandwidth allocations. Since the bandwidth has been scarce and expensive thus far, the crux of substantial throughput enhancements may be ascribed to improvements of the reuse of radio frequency resources. In this regard, cells with relatively small coverage areas may achieve the efficient spatial reuse of spectrum.

In light of the above, HetNet has been proposed and investigated by the 3GPP as part of a Study Item for LTE-Advanced (LTE-A) to provide better spectrum efficiency and enable high performance for user in hot spots, which are generally covered by low power BSs or nodes as discussed below. HetNet deployment is defined as a mixed deployment consisting of high power BSs (e.g., macro BSs) and low power BSs. Such low power BSs, including but not limited to pico BSs, femto BSs and relay nodes, have been introduced into LTE-A systems with targets of improving a system capacity, extending the serving coverage to cover hot zones, and serving users in coverage holes and so on. Such low power BSs may also provide true cell-splitting gains in the HetNet for carrying new frequency-time resources.

Although UEs may notably benefit from the above HetNet, a UE at a cell edge is less likely to have best DL and UL performance concurrently with its serving cell. The root cause behind this is that, due to the introduction of the low power BSs, traditional cell selection techniques would result in serious UL and DL imbalance, which would degrade over all system performance.

In particular, under the existing wireless systems including LTE Rel 8, the UE, from a DL point of view, would connect to a cell (i.e., a BS) that provides the highest DL received power among multiple cells, and that may be ascertained by using RSRP as a metric. Since there is a large degree of imbalance between the transmit power of a high power BS and that of a low power BS, and thereby the coverage area of the low power BS turns out to be much smaller than that of the high power BS, the UE would select the high power BS as its serving cell instead of the low power BS in terms of the cell range (i.e., coverage area). On the other hand, from a UL point of view, the selection of an optimal serving cell or BS is based upon the lowest path loss, which may be measured by the distance from the UE to the BS, rather than the highest DL received power as discussed above. Hence, in case the UE is closer to the low power BS than to the high power BS, the low power BS should be selected as a serving BS in terms of the path loss. For a better understanding of the above-mentioned circumstances, a discussion will be made with reference to FIG. 1.

Figure 1:
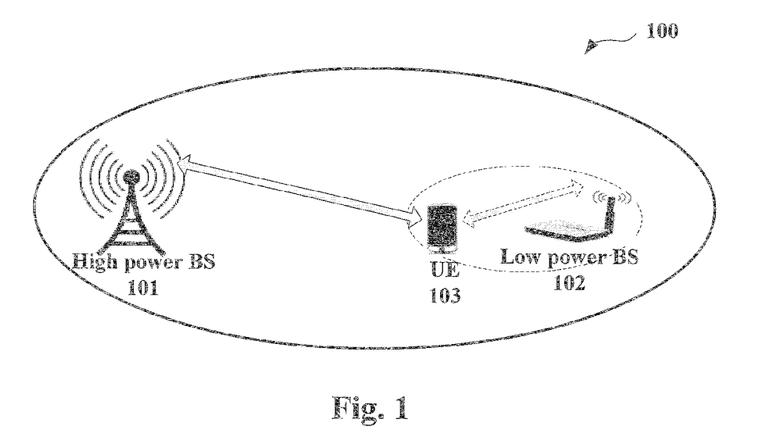
FIG. 1 illustrates a simplified and exemplary HetNet in which certain embodiments of the present invention may be practiced.

FIG. 1 exemplarily illustrates a simplified HetNet 100 consisting of a high power BS 101, a low power BS 102 and a UE 103. Due to distinct transmit power, the coverage area of the high power BS 101, as depicted by a large ellipse, encompasses the coverage area of the low power BS 102, as depicted by a relatively smaller ellipse. Further, it can be seen from the FIG. 1 that the UE 103 is further away from the high power BS 101 than from the low power BS 102.

We posit a scenario that the UE 103 has a huge amount of UL traffic to transmit and needs to select a proper BS to proceed, which is very likely to take place in the practical communication. As discussed previously, the UE 103 should select the high power BS 101 as its serving BS once the DL received power is applied as a criterion for the cell selection. Conversely, the UE should select the low power BS 102 as its serving BS in terms of the link loss. However, under the present scenario, if the high power BS 101 is selected as the serving BS for the UE 103, the UL bitrates of the UE 103 would be subject to large losses due to poor UL quality. It is apparent that selection of a serving BS merely relying upon the RSRP or cell range is problematic and could be damaging to the upcoming UL traffic of the UE.

To address the potential problems as above, a fixed biased RSRP solution has been proposed in the standard 3GPP TS 36.321 to enable cell range expansion of the low power BS such that its likelihood of being selected as a serving BS could be increased in the HetNet. In particular, this cell selection scheme adds a bias value in the RSRP such that more UEs are able to select low power BSs as their own serving BSs through the following equation:

$$\text{CellID} = \text{argmax}_{\{i\}} \{\text{RSRP}\_i + \text{bias}\_i\}, \quad (1)$$

wherein the CellID is an identifier of a cell, i denotes a BS number (e.g., from 1 to N), RSRP_i denotes the RSRP of the ith BS as measured by the UE, and bias_i is a fixed bias value (a.k.a., "bias RSRP") with respect to the ith BS and is predefined during the network planning. By addition of a fixed bias value to the RSRP_i, the cell range of the low power BS appears to be extended during the cell selection procedure, and thus the low power BS is more likely to be selected as a serving BS according to the RSRP-based cell selection criterion. As a result, after the low power BS is selected as a serving BS, the UL signal strength may be improved remarkably due to less link losses, even though the DL signal strength might decrease a little. However, even with cell range expansion in combination with the fixed bias RSRP, the optimal tradeoff between the UL and DL performance still cannot be achieved because traffic demands for the UL and DL are varied over time while the fixed bias RSRP cannot be adjusted correspondingly and dynamically.

For example, due to a sufficiently big fixed bias RSRP, the UE 103 may select the low power BS 102 as its serving cell. In the mean time, the UE 103 may have a very high DL traffic demand and none or a very low UL traffic demand. In this case, decreasing the DL performance to offset the UL performance once the low power BS 102 is selected as a serving BS does not contribute to the tradeoff between the UL and DL traffic. As a further example, if the value of the fixed bias RSRP is insufficiently big, the UE 103 is still likely to select, according to the equation (1), the high power BS 101 as its serving BS even if the UE 103 has a very high UL traffic demand and none or a very low DL traffic demand. It is clear that the optimal tradeoff between the DL traffic and the UL traffic is not realized.

It can be seen from the above examples that the cell range expansion with the fixed bias RSRP cannot provide an optimal cell selection solution.

SUMMARY

To address or mitigate at least one of the above potential problems, certain embodiments of the present invention would provide for an efficient way of selecting a proper serving cell for the UE such that an optimal tradeoff between the UL performance and DL performance could be realized in the HetNet.

According to an embodiment of the invention, there is provided a method for a cell selection. The method comprises obtaining a UL traffic status of a UE. The method further comprises determining, based upon the UL traffic status, a bias value for a measured quality indicator of a DL received signal with respect to the UE. In addition, the method comprises performing the cell selection based upon the bias value and the measured quality indicator.

According to another embodiment, there is provided a BS. The BS comprises an obtaining module adapted to obtain a UL traffic status of a UE. The BS further comprises a determining module adapted to determine, based upon the UL traffic status, a bias value for a measured quality indicator of a DL received signal with respect to the UE. In addition, the BS comprises a performing module adapted to perform the cell selection based upon the bias value and the measured quality indicator.

According to the foregoing embodiments of the present invention, upon determination of the bias value according to the UL traffic status, the cell range can be adjusted adaptively with respect to each UE based upon its own traffic demand during the cell selection procedure, resulting in a selection of a proper cell and thus enhancing overall DL and UL throughput in the HetNet. Further, through a flexible and dynamic selection of an optimal cell, the power consumption of the UE could be decreased and saved while the traffic demand can be guaranteed. Further, the embodiments of the present invention are easy to be implemented without imposing big influences on the existing network functions or settings.

BRIEF DESCRIPTION OF THE DRAWINGS

Further embodiments, details, advantages, and modifications of the present invention will become apparent from the following detailed description of the preferred embodiments, which is to be taken in conjunction with the accompanying drawings, wherein.

DETAILED DESCRIPTION

Embodiments of the invention will be described thoroughly hereinafter with reference to the accompanying drawings. It will be apparent to those skilled in the art that the invention may, however, be embodied in many different forms and should not be construed as limited to the embodiments and specific details set forth herein. Like numbers refer to like elements throughout the specification.

The features, structures, or characteristics of the invention described throughout this specification may be combined in any suitable manner in one or more embodiments. For example, the usage of the phrases "certain embodiments," "some embodiments," or other similar language, throughout this specification refers to the fact that a particular feature, structure, or characteristic described in connection with the embodiment may be included in at least one embodiment of the present invention. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more embodiments.

Embodiments of the invention may be applied in various wireless networks, including but not being limited to the 3GPP LTE network. Given the rapid development in communications, there will of course also be future type wireless communication technologies and systems with which the present invention may be embodied. It should not be seen as limiting the scope of the invention to only the aforementioned system.

In the context of the disclosure, for example, the term "high power BS," as implied by its name, may refer to any BSs that have relatively high transmission power and thereby cover a relatively large coverage area. Example of such a high power BS is a macro BS or more particularly, a macro eNB. Likewise, the term "low power BS" may refer to any BSs that have relatively low transmission power and thereby cover a relatively smaller coverage area as compared to the high power BS. Examples of such a low power BS are a pico BS, a femto BS, and a relay node, as employed in the current various communication systems. In addition, the term "cell selection" in the embodiments of the present invention may cover a cell handover or cell reselection.

In order for selection of a proper cell for each UE so as to provide an optimal tradeoff between DL and UL performance, the embodiments of the present invention propose dynamically and adaptively changing the bias RSRP for each UE by taking the traffic status into account. By ways of this, for each UE, the cell range of a low power BS is not constant as before and can be adjusted dynamically with the changes of the UE traffic status. Thereby, during the cell selection, the low power BS is more flexibly to be selected as a serving BS to meet the current traffic demand.

FIG. 1 illustrates a simplified and exemplary HetNet 100 in which certain embodiments of the present invention can be practiced. Descriptions regarding the HetNet 100 have been made previously and thus further description is omitted herein for simplicity's sake.

Figure 2:
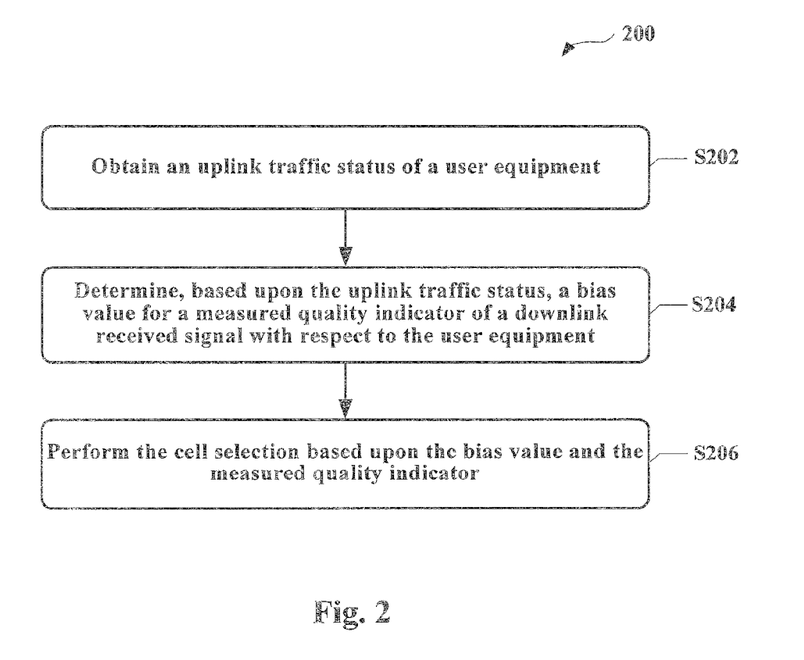
FIG. 2 schematically illustrates a method for a cell selection according to an embodiment of the present invention.

FIG. 2 schematically illustrates, according to an embodiment of the present invention, a method 200 for a cell selection which may be performed by a presently serving BS or any other BSs which are eligible for selection of a proper BS for a UE. As illustrated in FIG. 2, at step S202, the method 200 obtains a UL traffic status of a UE, e.g., the UE 103 as illustrated in FIG. 1. In some embodiments, the UL traffic status is indicated by a BSR received from the UE.

Then, the flow proceeds to step S204, at which the method 200 determines, based upon the UL traffic status, a bias value for a measured quality indicator of a DL received signal with respect to the UE. The bias value may be directly determined based upon the UL traffic status, for example, through a matching or mapping relation between the bias value and the UL traffic status. The bias value may also be determined based upon a UL adjusting value and a predetermined bias value of the measured quality indicator, such as the fixed bias_i in the equation (1). Here, the UL adjusting value is directly determined based upon the UL traffic status, for example, based upon a matching relation between the UL adjusting value and the UL traffic status. In some embodiments, the quality indicator of the DL received signal is RSRP, which may be measured by each UE and reported to the BS in a periodic or event-triggered manner. It should be noted that the RSRP as used throughout the embodiments of the present invention is only an example and should not be used to limit the present invention in any aspects. Any currently used or future developed technical parameters and metrics which may reflect the amount of the communication traffic could be used in the present invention.

Following determination of the bias value, the flow proceeds to step S206, at which the method 200 performs the cell selection based upon the bias value and the measured quality indicator. For example, after obtaining the bias value for a UE and multiple measured quality indicators as measured by the UE with respect to multiple potential target low power BSs, the presently serving BS may sum the bias value and the value of the measured quality indicator for each potential target low power BS and select one low power BS, which gets the maximum among the multiple potential target low power BSs, as a target BS in the cell selection procedure and may hand over the UE thereto.

It can be noted that the bias value for RSRP or bias RSRP as used by the embodiments of the present invention may be determined based upon a predetermined or fixed bias RSRP which may be equivalent to the bias_i in the equation (1), and an adjusting value which may be varied with the changes of the traffic status of the UE. In some cases where the same type of the multiple low power BSs are deployed in the HetNet, the predetermined bias RSRP could be omitted in the cell selection decision-making. The adjusting value for the RSRP as set forth in the embodiments of the present invention may relate to an adjusting value directed to the UL traffic, an adjusting value directed to the DL traffic, or an adjusting value directed to the resource utilization level, thereby respectively forming the bias value, second bias value and third bias value for the measured RSRP, as will be discussed in detail later.

Alternatively or additionally, in some embodiments, the method 200 obtains a DL traffic status of the UE and a resource utilization level. Then, the method 200 determines, based upon the DL traffic status, a second bias value for the measured quality indicator of the DL received signal with respect to the UE and further determines, based upon the resource utilization level, a third bias value for the measured quality indicator of the DL received signal with respect to the UE. Subsequent to determination of the second bias value and third bias value, the method 200 performs the cell selection based upon a mathematical combination of the bias value resulting from the step S204, the second bias value and the third bias value. In other words, to further improve accuracy of the bias value, in addition to the UL traffic status, the embodiments of the present invention also take the DL traffic status and resource utilization level into account.

With the method 200 as implemented in the embodiments of the present invention as discussed above, during the cell selection procedure using the DL received power as the metric for selecting a target BS, the cell range of at least one low power BS to which the UE is accessible appears to be adjusted adaptively and dynamically based upon the bias value that varies according to the UE's time-varying traffic. Further, due to respective different traffic statuses, the low power BS may have multiple different cell ranges for multiple UEs and the divergence of the cell ranges also provides an optimal tradeoff between DL and UL performance based upon the current traffic statuses.

For instance, for a UE that has a high traffic demand for the DL rather than the UL, according to the method 200, the bias value will be decreased to lower the low power BS's likelihood of being selected as a target BS, thereby apparently narrowing the cell range of the low power BS. As a result, the UE would select the high power BS (or macro cell) as a serving BS (or cell), given a higher DL received power and an SNR providing a better DL throughput capacity. On the other hand, for a UE that has a tiny DL demand but a high UL traffic demand, according to the method 200, the bias value will be increased to boost the low power BS's likelihood of being selected as a serving (or target) BS, thereby apparently extending the cell range of the low power BS. Consequently, the UE would select the low power BS as a serving BS and thus the cell covered by the low power BS as a serving cell since less path loss results in better UL signal strength at the low power BS side, leading to a better UL throughput capacity.

Figure 3:
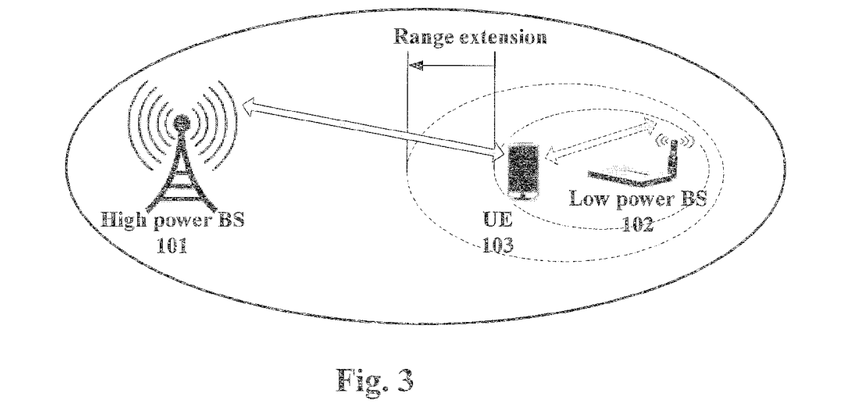
FIG. 3 schematically illustrates a scenario in which the method as illustrated in FIG. 2 is implemented in the HetNet as illustrated in FIG. 1 for performing a cell selection according to an embodiment of the present invention.

FIG. 3 schematically illustrates a scenario 300 in which the method 200 as illustrated in FIG. 2 is implemented in the HetNet 100 as illustrated in FIG. 1 for performing a cell selection according to an embodiment of the present invention. As illustrated in FIG. 3 and also discussed in connection with FIG. 1, the UE 103 may in communication with the high power BS 101, which acts as a serving BS for the UE 103, and over time, the UE 103 may move far away from the high power BS 101 and enter into the coverage area of the low power BS 102. By measuring the DL reference signal, the UE 103 may inform the high power BS 101 of the measurements (e.g., RSRP) and current traffic status. Upon receipt of the measurements and the current traffic status of the UE 103, the high power BS 101 may perform the cell selection procedure based upon the measurements and the bias value which corresponds to the traffic status.

In particular, according to the current communication specifications such as those specified by the 3GPP standards, the UE 103 may send the RSRP as measured to the high power BS 101. In addition to the RSRP, according to the embodiments of the present invention, it may also send the UL traffic status information to the high power BS 101, e.g., in a form of a BSR. Based upon the received BSR, the high power BS 101 may determine a UL adjusting value corresponding to the UL traffic status. For example, the high power BS 101 may retrieve the UL adjusting value from a mapping table in which a plurality of different traffic statuses correspond to a plurality of different adjusting values, respectively. The higher the UL traffic demand is, the bigger the UL adjusting is value would be.

Once the UL adjusting value is obtained, the high power BS 101 may decide whether or not to perform a cell selection towards the low power BS 102 based upon the UL adjusting value, a predetermined bias RSRP equivalent to the item bias_i as expressed in the equation (1), and the measured RSRP equivalent to the item RSRP_i as expressed in the equation (1). If the UL adjusting value is sufficient big and thus the sum of the UL adjusting value, the predetermined bias RSRP and the measured RSRP is so big that the low power BS can be selected as a (target) serving BS, then the high power BS 101 may select the low power BS 102 as a serving BS for the UE for the subsequent communication. From the standpoint of the low power BS 102, it appears that its cell range is extended in the cell selection procedure. As illustrated by a one-way arrow in FIG. 3, the cell range of the low power BS 102 appears to be extended as depicted from a small ellipse to a bigger one due to the big bias value such that it is more likely to be selected or determined by the high power BS 101 as a next serving BS for the UE 103.

Although FIG. 3 only illustrates a range extension scenario, it should be understood that the cell range of the low power BS 102 could be contracted due to less UL traffic. Thereby, the low power BS 102 is less likely to be selected as a target BS when performing a handover or cell reselection procedure. In this manner, the BS that may have high DL received signal power would be selected as a target BS for the cell selection.

Figure 4:
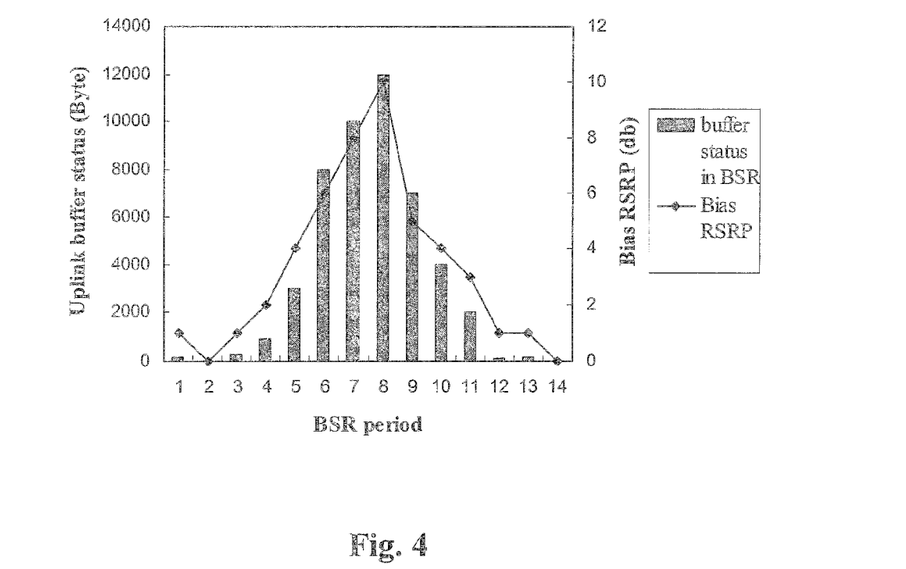
FIG. 4 is a histogram schematically illustrating that values of the bias RSRP are dynamically and adaptively varied as the changes of the UL traffic statuses which are included in the BSRs according to an embodiment of the present invention.

FIG. 4 is a histogram schematically illustrating that values of the bias RSRP are varied dynamically and adaptively as the changes of the UL traffic statuses which are included in the BSRs according to an embodiment of the present invention. As illustrated in FIG. 4, in each BSR reporting period, the UE may have different UL buffer statuses in bytes and the UL buffer status with a higher amount of bytes correspond to higher bias RSRP. Take a BSR period "8" as an example, 12000 bytes are queued in the UL buffer of the UE at this instance waiting to be sent out and thus a low power BS that the UE may be accessible to would be given a higher bias RSRP 10 db, based upon which the low power BS would be possible to be selected as a serving BS. It is clear from the FIG. 4 that the embodiments of the present invention flexibly adjust the bias RSRP according to the traffic demand so as to enable the low power BS to be selected as a serving or target BS as appropriate.

Figure 5:
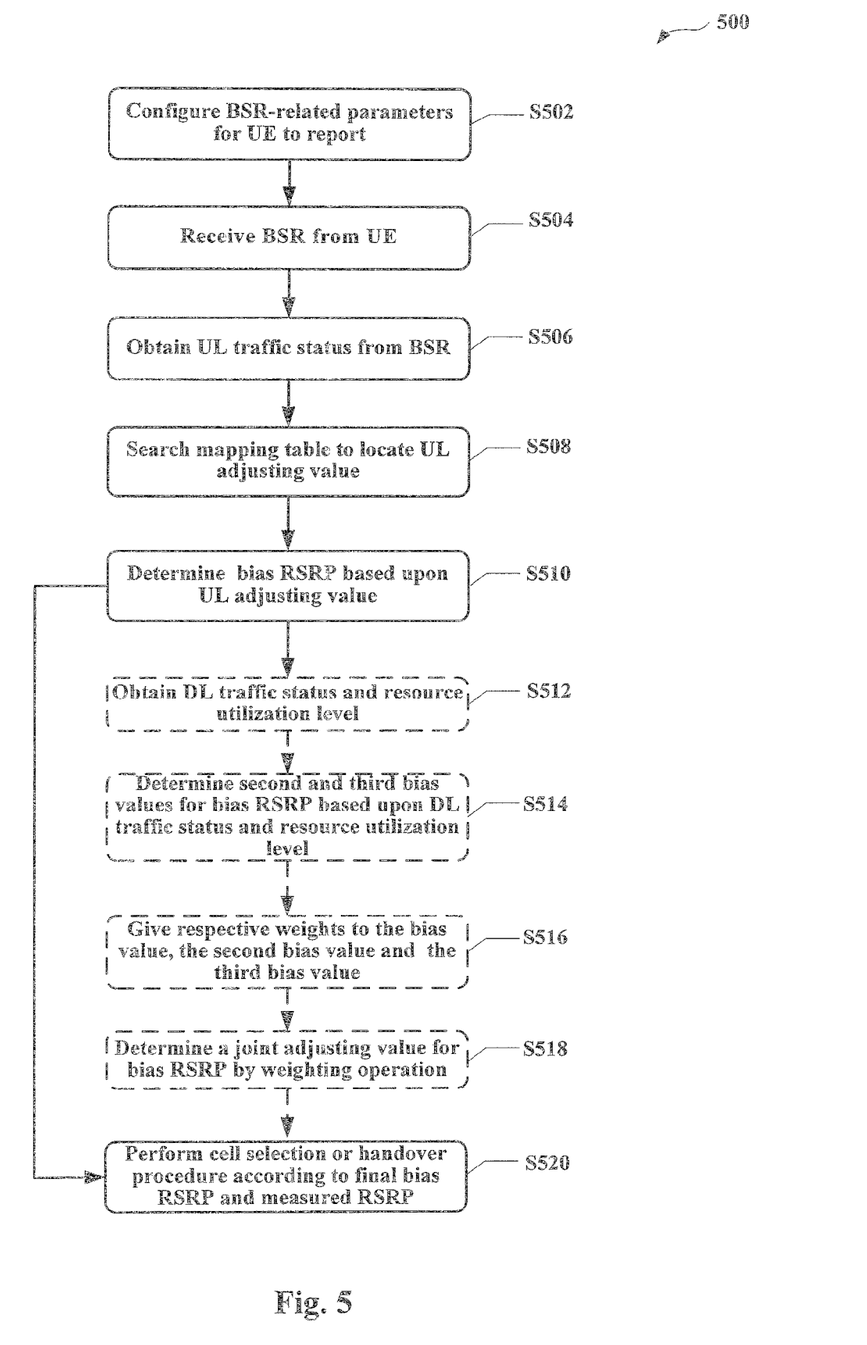
FIG. 5 schematically illustrates a method for a cell selection according to another embodiment of the present invention.

FIG. 5 schematically illustrates a method 500 for a cell selection according to another embodiment of the present invention, which may be performed by a BS currently serving the UE. As illustrated in FIG. 5, at step S502, the method 500 configures BSR-related parameters to enable the UE to report its current UL traffic status to the BS. In an embodiment, when each UE establishes an RRC connection with a BS, the BS may configure a BSR period by IE MAC-MainConfig in the message RRCConnectionSetup. The parameter periodicBSR-Timer in IE MAC-MainConfig stands for a BSR period and can be configured as Period_BiasRSRPAdjust which is the period to adjust the bias RSRP for cell range expansion based upon the BSR.

The flow then proceeds to step S504, at which the method 500 receives the BSR from the UE at each period as predefined by the Period_BiasRSRPAdjust. Then at step S506, the method 500 obtains the UL traffic status from the BSR. The details regarding how to obtain the UL traffic status from the BSR are discussed as below.

Figure 6:
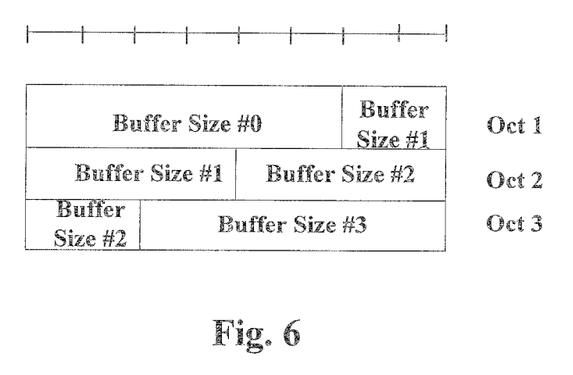
FIG. 6 schematically illustrates long BSR MAC control elements according to an embodiment of the present invention.

Upon receiving the BSR, the BS may get BSR MAC control elements with a long BSR format from all UEs, as illustrated in FIG. 6. From the elements as illustrated in FIG. 6, the BS is able to determine the buffer sizes that are available for transmission. In general, the BSR uses 6 bits, as illustrated in FIG. 6 in blocks, to express the indices of buffer sizes for each logic channel group in the UE. For easy discussions, we may use Index_UplinkBuffer_n_m_k to indicate all BSR information from the UE, wherein n denotes a logical channel group with a value ranging from 0 to 3, m denotes a BSR index from each UE with a value ranging from 1 to a number of UEs, and k is the current bias RSRP adjustment period.

Further, let {Index_UplinkBuffer_max_m_k}=max {Index_Uplinkbuffer_n_m_k}, wherein Index_UplinkBuffer_max_m_k stands for the maximal traffic demand of the logic channel group from each UE at this period and this maximal traffic demand can be regarded as the UL traffic status of the UE. It should be noted that the descriptions regarding the BSR herein are merely for an illustrative purpose and a person skilled in the art can readily understand how to determine the traffic from the BSR based upon the teaching of the present invention. Furthermore, for a concise purpose, some technical details regarding the BSR are not discussed herein, and more information regarding the BSR can be found in the technical specifications, such as 3GPP TS23.321.

Upon obtaining the UL traffic status, the method 500 advances to step S508, at which the method 500 searches a mapping table to locate the UL adjusting value for the bias RSRP which may be expressed as {Bias_RSRP_Adjust_m_k}. The mapping table may take the following form, as a non-limiting example.

TABLE 1

| Bias_RSRP_Adjust_m_k | Index_UplinkBuffer_max_m_k | Bias_RSRP_Adjust_m_k | Index_UplinkBuffer_max_m_k |
| --- | --- | --- | --- |
| −6 | 0 | 1 | 32 |
| −6 | 1 | 1 | 33 |
| −6 | 2 | 1 | 34 |
| −5 | 3 | 1 | 35 |
| −5 | 4 | 1 | 36 |
| −5 | 5 | 2 | 37 |
| −5 | 6 | 2 | 38 |
| −4 | 7 | 2 | 39 |
| −4 | 8 | 2 | 40 |
| −4 | 9 | 2 | 41 |
| −4 | 10 | 3 | 42 |
| −3 | 11 | 3 | 43 |
| −3 | 12 | 3 | 44 |
| −3 | 13 | 3 | 45 |
| −3 | 14 | 3 | 46 |

TABLE 1-continued

| Bias_RSRP_Adjust_m_k | Index_UplinkBuffer_max_m_k | Bias_RSRP_Adjust_m_k | Index_UplinkBuffer_max_m_k |
|---|---|---|---|
| −2 | 15 | 4 | 47 |
| −2 | 16 | 4 | 48 |
| −2 | 17 | 4 | 49 |
| −2 | 18 | 4 | 50 |
| −1 | 19 | 4 | 51 |
| −1 | 20 | 5 | 52 |
| −1 | 21 | 5 | 53 |
| −1 | 22 | 5 | 54 |
| −1 | 23 | 5 | 55 |
| −1 | 24 | 5 | 56 |
| 0 | 25 | 6 | 57 |
| 0 | 26 | 6 | 58 |
| 0 | 27 | 6 | 59 |
| 0 | 28 | 6 | 60 |
| 0 | 29 | 6 | 61 |
| 0 | 30 | 6 | 62 |
| 1 | 31 | 6 | 63 |

It can be seen from the above table 1 that the higher UL traffic is given the higher Bias_RSRP_Adjust_m_k. It should be noted that the algorithm and setting as above to determine Bias_RSRP_Adjust_m_k is only for an exemplary and illustrative purpose and the present invention is not limited to these specific forms. Rather, the embodiments of the present invention may include any other methods suitable for determining the Bias_RSRP_Adjust_m_k based upon the {Index_UplinkBuffer_n_m_k}. For instance, relationships between {Index_UplinkBuffer_n_m_k} and {Bias_RSRP_Adjust_m_k} can be defined by way of an abstract function F(*) as below:

$$\{Bias\_RSRP\_Adjust\_m\_k\} = F(\{Index\_UplinkBuffer\_n\_m\_k\}).$$

Therefore, the relationship between the {Index_UplinkBuffer_n_m_k} and {Bias_RSRP_Adjust_m_k} may take any suitable forms. For example, it may take a one-to-one mapping form as taken by the table 1. Further, it may take an exponential form.

Once the UL adjusting value (i.e., Bias_RSRP_Adjust_m_k) is determined, the method 500 proceeds to step S510, at which the method 500 determines, based upon the UL adjusting value, the bias RSRP at the k+1 period by an example equation (2) as below.

$$\{Bias\_RSRP\_Target\_m\_k+1\} = Bias\_RSRP\_Nominal + \{Bias\_RSRP\_Adjust\_m\_k\}, \quad (2)$$

wherein the Bias_RSRP_Target_m_k+1 denotes the bias RSRP for cell range expansion for each UE at k+1 period according to the embodiments of the present invention, Bias_RSRP_Nominal is a constant and similar to the bias_i in the equation (1).

Afterwards, the method 500 may sum the final bias RSRP Bias_RSRP_Target_m_k+1 (i.e., bias value for the measured RSRP) according to the embodiments of the present invention and the measured RSRP of the low power BS to determine whether the measured low power BS is qualified as a next serving BS for the UE and may perform, at step S520, a cell selection or handover procedure according to the final bias RSRP and measured RSRP. For example, if the bias RSRP is big due to high UL traffic demand and the resulting sum is the biggest among potential BSs, then the low power BS in question is more likely to be selected in the cell (re)selection procedure. Otherwise, it would be negated for being selected as a serving BS for the UE. As discussed above, in view of the varying bias RSRP according to the embodiments of the present invention, the cell range of the BS appears to be extended or narrowed flexibly in the cell selection procedure.

The foregoing has discussed performance of the cell selection according to the UL traffic status in connection with the steps S502-S510 and S520. As mentioned before, to further improve the accuracy of the cell selection, the embodiments of the present application additionally propose alternatives to the cell selection by taking into consideration a DL traffic status and a resource utilization level, which may also be critical factors in the cell selection procedure, in addition to the UL traffic status as discussed above. Therefore, the method 500 continues with step S512, at which the method 500 obtains DL traffic status and the resource utilization level. Due to controls of the DL scheduling and transmissions, it is easy for the serving BS to obtain the DL traffic status of the UE and the resource utilization level. For example, the DL traffic status may relate to an amount of data to be transmitted to the UE and may be obtained by the BS based upon data forwarded from a serving gateway. The heavier the DL traffic is, the higher the likelihood of the high power BS being selected as a serving BS is. Thereby, it may implicitly impact the cell range of the low power BS in the cell selection procedure. The resource utilization level may relate to a number of radio resources that are available for or could be assigned to the UE for DL and UL transmissions in view of the present communication conditions. If the resource utilization level is relatively high in the serving cell and thus there may be less resources available for a served UE, then the cell range of the presently serving BS with respect to the served UE should be narrowed in the cell selection procedure such that the served UE could select other BS as a new serving BS, and vice versa. To this end, multiple adjusting values, similar to the adjusting values with respect to the UL traffic statuses, could also be preset for multiple different resource utilization levels, e.g., in a form of a mapping table.

Then, the method 500 determines, at step S514, a DL adjusting value for the bias RSRP based upon the DL traffic status and an adjusting value corresponding to the resource utilization level, e.g., by searching respective mapping tables similar to the table 1. Thereby, the method 500 obtains a second bias value and a third bias value corresponding to the measured RSRP with respect to the UE by, e.g., performing similar operations as described in connection with step S510. Additionally or optionally, the method 500 gives, at step S516, respective weights to the bias value as obtained at step S510, the second bias value, and the third bias value and determines, at step S518, a joint adjusting value for the bias RSRP. For example, the joint adjusting value is obtained by mathematical combination (such as the weighting) of the bias value relating to the UL traffic, the second bias value relating to the DL traffic, and the third bias value relating to the resource utilization level. It should be noted that the weighting operation as set forth herein is only for an illustrative purpose and should not be used to limit the present invention. A person skilled in the art can use other suitable mathematical operations on these three parameters.

Then, the method 500 performs, at step S520, the cell selection or handover procedure based upon the measured RSRP and the final bias RSRP. It is to be understood that the final bias RSRP herein may be obtained based upon a predetermined bias RSRP and the joint adjusting value as discussed above, e.g., by a summing operation.

With the adjusted bias RSRP for each UE, the serving BS is able to more accurately and efficiently execute the existing procedures in regards to the cell selection decision and only update the important parameter for each UE, i.e., the bias RSRP {Bias_RSRP_Target_m_k+1}. To this end, the BS may maintain a table of bias RSRP for each UE because different traffic statuses may derive different cell ranges to adapt different traffic demands.

It should be noted that the foregoing has discussed in detail how to perform a cell selection based upon an adjustable bias RSRP associated with the traffic status of the UE, it is purely for the purposes of explaining the embodiments of the present invention. A person skilled in the art can readily understand and easily implement the embodiments of the invention based upon the disclosure of this specification. Further, it is to be understood that additional or alternative steps that might occur in the flow are not set forth herein so as not to unnecessarily obscure the scope of the embodiments of the present invention.

Figure 7:
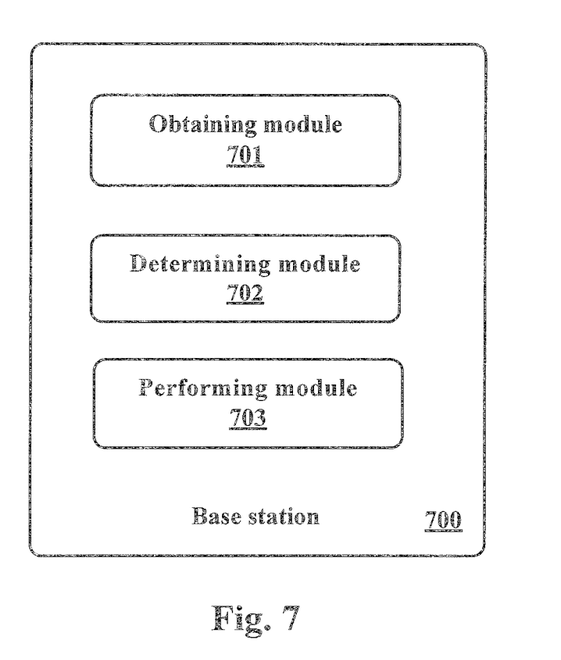
FIG. 7 is a simplified schematic block diagram illustrating a BS according to another embodiment of the present invention.

FIG. 7 is a simplified schematic block diagram illustrating a BS 700 according to another embodiment of the present invention. As illustrated in FIG. 7, the BS 700 may, among other things, include an obtaining module 701, a determining module 702 and a performing module 703. The obtaining module 701 is adapted to obtain a UL traffic status of a UE, corresponding to the step S202 as recited in the method 200. The determining module 702 is adapted to determine, based upon the UL traffic status, a bias value for a measured quality indicator of a DL received signal with respect to the UE, corresponding to the step S204 as recited in the method 200. The performing module 703 is adapted to perform the cell selection based upon the bias value and the measured quality indicator, corresponding to the step S206 as recited in the method 200. It should be noted that the BS 700 according to the embodiments of the present invention has the capability of performing the methods 200 and 500 such that a proper and suitable BS could be selected based upon the UL and DL traffic, resulting in an optimal tradeoff between the UL and DL performance. Further, the BS 700 could be embodied as one of a macro BS, a pica BS, a femto BS and a relay node.

It will be appreciated that the invention may be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units and processors.

It is to be noted that, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Further, it is to be noted that, the order of features/steps in the claims or in the specification do not imply any specific order in which the features/steps must be worked. Rather, the steps/features may be performed in any suitable order.

The terminology used herein is for the purpose of describing particular embodiments only and is not intended to limit to the invention. As used herein, the singular forms "a," "an" and "the" are intended to comprise the plural forms as well, unless otherwise stated. It will be further understood that the terms "including," "comprising" and conjugation thereof when used herein, specify the presence of stated features, integers, steps, operations, elements, and/or components, but do not preclude the presence or addition of one or more other features, integers, steps, operations, elements, components, and/or groups thereof.

Although the invention has been particularly shown and described with reference to exemplary embodiments thereof, it will be understood by those skilled in the art that various changes in form and details may be made without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims.

What is claimed is:

1. A method for a cell selection, comprising:
    obtaining an uplink traffic status of a user equipment;
    determining, based upon the uplink traffic status, a bias value for a measured quality indicator of a downlink received signal with respect to the user equipment, wherein determining the bias value is based on a mapping between the bias value and the uplink traffic status;
    obtaining a downlink traffic status of the user equipment and a resource utilization level;
    determining, based upon the downlink traffic status, a second bias value for the measured quality indicator of the downlink received signal with respect to the user equipment;
    determining, based upon the resource utilization level, a third bias value for the measured quality indicator of the downlink received signal with respect to the user equipment; and
    performing the cell selection based upon a mathematical combination of the bias value, the second bias value and the third bias value.

2. The method as recited in claim 1, wherein the uplink traffic status is indicated by a buffer status report received from the user equipment.

3. The method as recited in claim 1, wherein the quality indicator of the downlink received signal is reference signal received power, RSRP.

4. The method as recited in claim 3, wherein determining the bias value comprises:
    determining, based upon an uplink adjusting value and a predetermined bias RSRP, the bias value for the measured RSRP, wherein the uplink adjusting value is determined based upon the uplink traffic status.

5. The method as recited in claim 1, wherein the mathematical combination of the bias value, the second bias value, and the third bias value is formed by giving respective weights to the bias value, the second bias value, and the third bias value and summing the weighted bias value, the weighted second bias value, and the weighted third bias value.

6. The method as recited in claim 1, wherein the cell selection includes a cell handover or a cell reselection.

7. A base station, comprising one or more processors configured to:
    obtain an uplink traffic status of a user equipment;
    determine, based upon the uplink traffic status, a bias value for a measured quality indicator of a downlink received signal with respect to the user equipment, wherein determining the bias value is based on a mapping between the bias value and the uplink traffic status;

obtain a downlink traffic status of the user equipment and a resource utilization level;

determine, based upon the downlink traffic status, a second bias value for the measure quality indicator of the downlink received signal with respect to the user equipment;

determine, based upon the resource utilization level, a third bias value for the measured quality indicator of the downlink received signal with respect to the user equipment; and perform the cell selection based upon a mathematical combination of the bias value, the second bias value and the third bias value.

8. The base station as recited in claim 7, wherein the uplink traffic status is indicated by a buffer status report received from the user equipment.

9. The base station as recited in claim 7, wherein the quality indicator of the downlink received signal is reference signal received power, RSRP.

10. The base station as recited in claim 9, wherein the one or more processors are configured to determine the bias value for the measured RSRP based upon an uplink adjusting value and a predetermined bias RSRP, wherein the uplink adjusting value is determined based on the uplink traffic status.

11. The base station as recited in claim 7, wherein the mathematical combination of the bias value, the second bias value, and the third bias value is formed by giving respective weights to the bias value, the second bias value, and the third bias value and summing the weighted bias value, the weighted second bias value, and the weighted third bias value.

12. The base station as recited in claim 7, wherein the base station is macro base station, pico base station, femto base station or relay node.

* * * * *